United States Patent [19]

Müller et al.

[11] Patent Number: 4,641,734
[45] Date of Patent: Feb. 10, 1987

[54] SYNCHRONIZING MECHANISM FOR CLUTCHES

[75] Inventors: Erich Müller, Kornwestheim; Rühle Günter, Bietig; Wilhelm Stocker, Oberstenfeld, all of Fed. Rep. of Germany

[73] Assignee: Getrag Getriebe-und Zahnradfabrik GmbH, Ludwigsburg, Fed. Rep. of Germany

[21] Appl. No.: 610,344

[22] Filed: May 15, 1984

[51] Int. Cl.$^4$ .............................................. F16D 23/06
[52] U.S. Cl. ............................... 192/53 F; 192/53 G; 192/67 A
[58] Field of Search ............ 192/48.91, 53 F, 53 E, 192/53 G, 67 A

[56] References Cited

U.S. PATENT DOCUMENTS

| 2,369,842 | 2/1945 | Neracher et al. ............... | 192/53 F |
| 2,397,344 | 3/1946 | Fishburn .......................... | 192/53 F |
| 2,788,874 | 4/1957 | Forster ............................ | 192/53 F |
| 4,349,090 | 9/1982 | Griesser ....................... | 192/53 F X |
| 4,378,710 | 4/1983 | Knodel ......................... | 192/53 G X |

FOREIGN PATENT DOCUMENTS

| 1924724 | 11/1969 | Fed. Rep. of Germany . |
| 1475333 | 11/1969 | Fed. Rep. of Germany . |
| 2510657 | 9/1976 | Fed. Rep. of Germany . |
| 2613388 | 10/1976 | Fed. Rep. of Germany . |
| 2706661 | 8/1978 | Fed. Rep. of Germany . |
| 2754382 | 4/1979 | Fed. Rep. of Germany . |
| 2659448 | 11/1981 | Fed. Rep. of Germany . |
| 2466668 | 4/1981 | France . |
| 803979 | 12/1958 | United Kingdom ............... 192/53 F |

Primary Examiner—Rodney H. Bonck
Assistant Examiner—Alan G. Towner
Attorney, Agent, or Firm—Burmeister, York, Palmatier, Hamby & Jones

[57] ABSTRACT

In a synchronizing mechanism for clutches, there are provided between the gear shift sleeve and the synchronizing ring (14,15) stop bodies in the form of dogs (25, 26) which are in contact with the gear shift sleeve (between the teeth 34) in the circumferential direction by form-locking engagement and in the axial direction through spring-loaded stop balls (21) and in the neutral position are spaced from the synchronizing ring by a distance substantially equal to the axial extension of the check faces (32, 33) between the gear shift sleeve and the synchronizing ring. In this manner it is ensured that during shifting the axial force previously exerted through the check faces (32, 33) on the synchronizing ring (for instance 15) is replaced by an axial force which is transmitted by the dog and which prevents the synchronizing ring from coming off the countercone before the form-locking connection between the gear shift sleeve and the clutch body is established.

13 Claims, 6 Drawing Figures

SYNCHRONIZING MECHANISM FOR CLUTCHES

FIELD OF THE INVENTION

The present invention relates to a synchonizing mechanism for clutches, in particular for transmissions for motor vehicles, comprising at least one pair of gears which can be cut into or out of the line of force transmission by axial displacement of an internally toothed gear shift sleeve connected via a guide sleeve to a shaft so as to rotate with the latter, the one gear of the said pair of gears which is coaxially arranged with the gear shift sleeve being provided with an externally toothed clutch body, and comprising further a synchronizing ring which in the circumferential direction is in form-locking engagement with the gear shift sleeve and in frictional engagement with the clutch body and in the axial direction is in contact with the gear shift sleeve via spring detent means and which comprises check faces for the gear shift sleeve permitting the internal toothing of the gear shift sleeve to come into engagement with the external toothing of the clutch body only when the two parts rotate at synchronous speed.

BACKGROUND OF THE INVENTION

Synchronizing mechanisms of this type, which are based on the Borg-Warner synchromesh principle, have been previously known in many different designs. A particular design of such a synchronizing mechanism has been described for instance in German Patent Specification No. 26 59 448. During shifting the gear shift sleeve is axially displaced from a neutral position entraining on this way the synchronizing ring via the spring detent means to urge it against the countercone of the clutch body. This brings the synchronizing ring and the clutch body into frictional engagement whereby the speeds of the shaft, the gear shift sleeve and the synchronizing ring on the one hand and the clutch body and that gear of the pair of gears which is to be cut in on the other hand are adapted to each other. As long as synchronism is speed in not reached, the synchronizing ring is rotated by the clutch body in the circumferential direction relative to the gear shift sleeve to the extent permitted by the form-locking engagement between the synchronizing ring and the gear shift sleeve. The synchronizing ring is provided with check faces which are thereby moved into a position in which they get into engagement with corresponding check faces provided on the gear shift sleeve to prevent any axial displacement of the gear shift sleeve towards the clutch body. In the known synchronizing mechanisms, these check faces are usually provided on an external toothing of the synchronizing ring which is identical to the external toothing of a clutch body, while the counterfaces are provided at the ends of the teeth forming the internal toothing of the gear shift sleeve.

When synchronism in speed has been reached, the gear shift sleeve can move past the check faces of the synchronizing ring to engage the external toothing of the clutch body. The contact established between the gear shift sleeve and the synchronizing ring by means of the spring detent means is simultaneously released because the synchronizing ring is permitted to follow the axial movement of the gear shift sleeve only until it comes into contact with the countercone of the clutch body. If the gear shift sleeve is to move further, as necessary when the clutch is to be engaged, the axial connection between the gear shift sleeve and the synchronizing ring must necessarily be released.

It is a drawback of these known synchronizing mechanisms that the synchronizing ring is no longer subjected to any axial force after the action of the spring detent means has been released between the gear shift sleeve and the synchronizing ring and the gear shift sleeve has in addition passed the check faces of the synchronizing ring. As a result thereof, the synchronizing ring may come free of the countercone of the clutch body when shifting, during the time interval between the release of the axial force acting upon the synchronizing ring and the establishment of the connection between the gear shift sleeve and the coupling body, and the synchronization may consequently be lost again. This may lead to shifting noise due to the fact that the teeth of the gear shift sleeve slide past the teeth of the clutch body before the gear shift sleeve and the gear can finally be brought into engagement, maybe only with some effort. The risk of such trouble being encountered is particularly great with cold transmissions where very viscous transmission oil has a high breaking effect on the gears so that the forces counteracting the synchronization are too high to be transmitted by an unloaded synchronizing ring.

SUMMARY OF THE INVENTION

Now, it is the object of the present invention to improve a synchronizing mechanism of the type described above so that once synchronous speeds have been reached during shifting, the gear shift sleeve and the coupling body of the gear cannot come to rotate again at different speeds.

This object is achieved in accordance with the invention in that there is provided between the gear shift sleeve and the synchronizing ring at least one stop body which is in contact with the gear shift sleeve in the circumferential direction by form-locking engagement and in the axial direction through spring detent means and which further, in the neutral position, is spaced from the synchronizing ring by a distance substantially equal to the axial extension of the check faces between the gear shift sleeve and the synchronizing ring.

By arranging the stop body between the gear shift sleeve and the synchronizing ring it is ensured that when the axial force exerted by the gear shift sleeve upon the synchronizing ring via the check faces does no longer exist because the check faces between the gear shift sleeve and the synchronizing ring have come out of engagement, then the stop body will come to bear against the synchronizing ring and, thus, subject the synchronizing ring to an axially directed force which will prevent the synchronizing ring from coming off the countercone of the coupling body. The connection between the gear shift sleeve and the stop body is again established by spring detent means which can be designed in a suitable manner so that a sufficiently high axial force is exerted upon the synchronizing ring until the internal toothing of the gear shift sleeve is actually in engagement with the external toothing of the coupling body. Thereafter the spring detent means may come out of engagement when the gear shift sleeve is moved axially into its final engaged position. It appears that the invention avoids any noise resulting from the synchronization getting lost during the shifting process, and this without notable constructional input or expense. In particular, the invention does not increase the volume of the conventional synchronizing mechanisms.

The stop body can be realized in a simple manner by a dog arranged within an axially directed groove in the gear shift sleeve and/or the guide sleeve. If the axial connection between the gear shift sleeve and the synchronizing ring is also formed by at least one dog arranged in an axially directed groove in the gear shift sleeve and/or the guide sleeve, then the dog forming the stop body and the dog establishing the connection between the gear shift sleeve and the synchronizing ring can be arranged in a particularly advantageous manner in a common groove. In a preferred embodiment of the invention, the two dogs arranged in a common groove are symmetrical relative to the radial plane extending between them, and their outer ends, relative to the radial plane, are provided with a projection. Correspondingly, the synchronizing ring of this embodiment of the invention is also provided with a projection which in the end positions of the synchronizing ring defined in the circumferential direction by the form-locking engagement, faces only one of the two dogs at a time. The particular advantage of this embodiment is to be seen in the fact that identical dogs can be used for establishing the axial connection between the gear shift sleeve and the synchronizing ring and as stop body and that two such dogs can be arranged in a common groove which simplifies the design of such a gear shift sleeve. This embodiment of the invention is particularly simple and convenient for transmissions in which gears with clutch bodies and synchronizing rings are provided on both sides of the gear shift sleeve, because in this case the dogs arranged in a common groove may be symmetrical also relative to the center plane extending vertically to the axis of the gear shift sleeve so that they can act alternately on both synchronizing rings.

In another particularly advantageous embodiment of the invention which is likewise intended for transmissions in which gears with clutch bodies and synchronizing rings are arranged on both sides of the gear shift sleeve, the dogs establishing the axial connection between the gear shift sleeve and the synchronizing ring are formed by lateral lugs on the coacting synchronizing rings with their ends being located opposite the flank of the other synchronizing ring and at a certain distance therefrom. So, no separate dogs are required in this embodiment of the invention which largely facilitates the assembly of the synchronizing mechanism. In addition, this design of the synchronizing ring opens up other advantageous design possibilities for the synchronizing mechanism, such as the use of an external brake cone.

A particular advantage of the synchronizing mechanism of the invention is to be seen in the fact that it permits the check faces for the gear shift sleeve to be provided at the flanks of the projections or the lugs of the synchronizing rings so that they do not coact with the internal toothing of the clutch which is to be brought into engagement with the external toothing of the clutch body, but rather with counterfaces arranged on the walls of the grooves provided in the gear shift sleeve for receiving the dogs. The separation of these check faces from the toothing to be brought into engagement offers the advantage that both of them can be independently and, thus, optimally designed. In particular, the angle of the check faces relative to the axial direction may be greater than the corresponding angle at the ends of the engaging teeth of the gear shift sleeve and the clutch body. A smaller angle at the teeth to be brought into engagement facilitates the engagement between the toothing of the gear shift sleeve and the toothing of the clutch body.

The fact that in the synchronizing mechanism of the invention the check faces provided on the synchronizing ring are independent from the clutch toothing so that the synchronizing ring itself need not be provided with a matching toothing, permits the synchronizing ring to be designed without regard to such toothing.

Accordingly, there is no reason why the synchronizing ring should not be rotatable within certain limits relative to the gear shift sleeve. A preferred embodiment of the invention provides for example that the angle of rotation between the synchronizing rings and the gear shift sleeve, which is limited by the form-locking connection between the gear shift sleeve and the synchronizing ring, is greater by at least one half of the tooth pitch of the gear shift sleeve and the clutch body than the angle of rotation determined by the extension of the check faces. This feature also helps render the shifting operation smoother and largely jerk-free. After synchronization has been reached, the locking action of the synchronizing ring is released due to the fact that the gear and the synchronizing ring engaged upon the countercone of the coupling body are slightly rotated relative to the gear shift sleeve through the inclined check faces. When the pointed teeth of the gear shift sleeve then meet the teeth of the clutch body, with their likewise pointed ends, the gear and the clutch body will as a rule perform an additional rotary movement relative to the gear shift sleeve. The improvement of the invention just described enables the synchronizing ring to follow this second rotary movement without the need to come off the countercone of the clutch body, provided the teeth meet each other in such a manner that the continued rotation increases the distance between the check faces that had been in engagement last.

This will be the case statistically in 50% of all cases. Only when the relative rotation between the clutch body and the gear shift sleeve would have to be oppositely directed—in which case the movement is prevented by the bodies carrying the check faces resting against each other—will the synchronizing ring have to be released by force from the countercone of the clutch body during shifting. The resulting resistance which makes itself felt during shifting as the so-called second pressure point and which is often felt to be disturbing is thus avoided in 50% of all cases.

BRIEF DESCRIPTION OF THE DRAWINGS

The invention will be described hereafter in closer detail with reference to the embodiments shown in the drawing, it being understood that the features described in the specification and shown in the drawing may be used in other embodiments of the invention individually or in any desired combination. In the drawings.

DETAILED DESCRIPTION OF ILLUSTRATION EMBODIMENTS

Figures 1, 2:
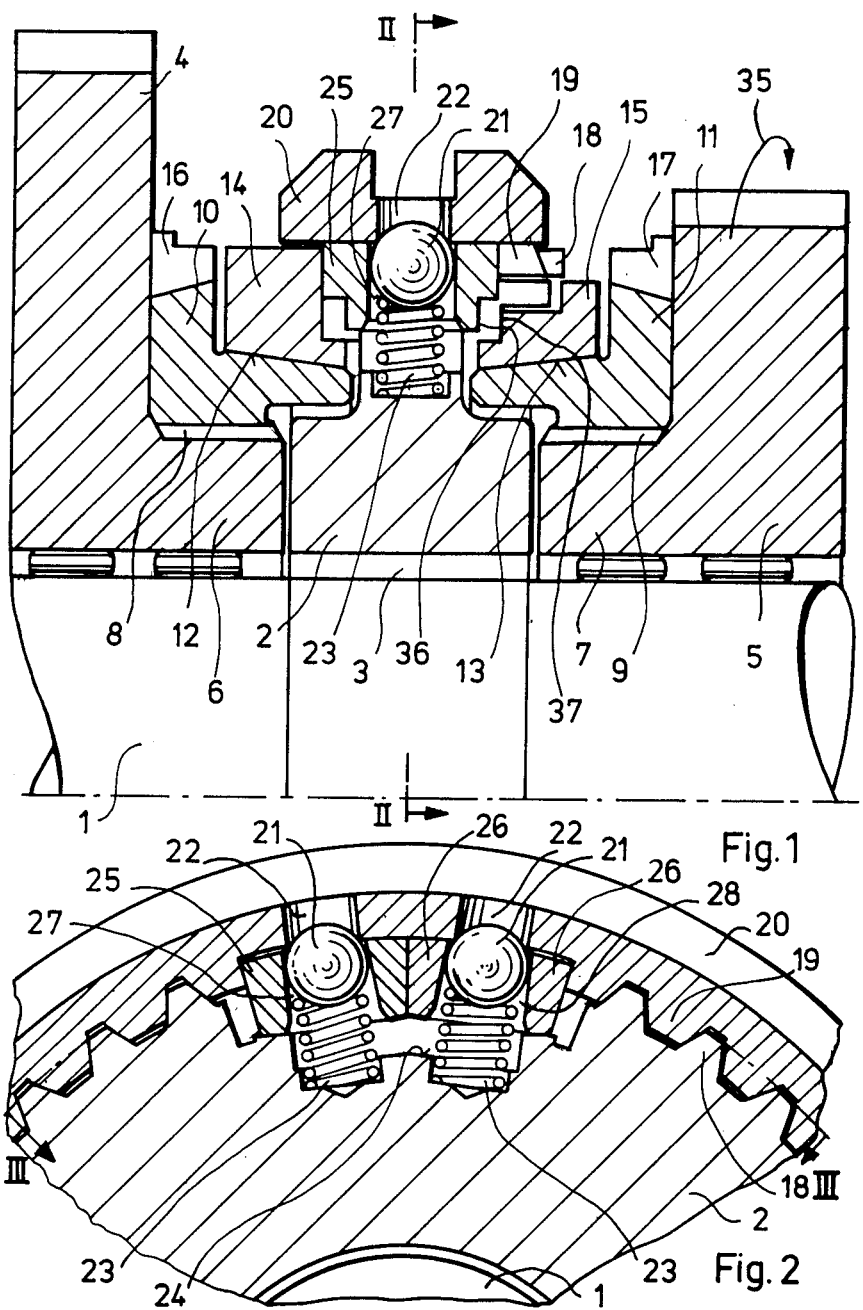
FIG. 1 shows a longitudinal cross-section through a portion of a transmission comprising a sychronizing mechanism in accordance with the invention.
FIG. 2 is a sectional view along line II—II through the portion of a transmission shown in FIG. 1.
Figure 3:
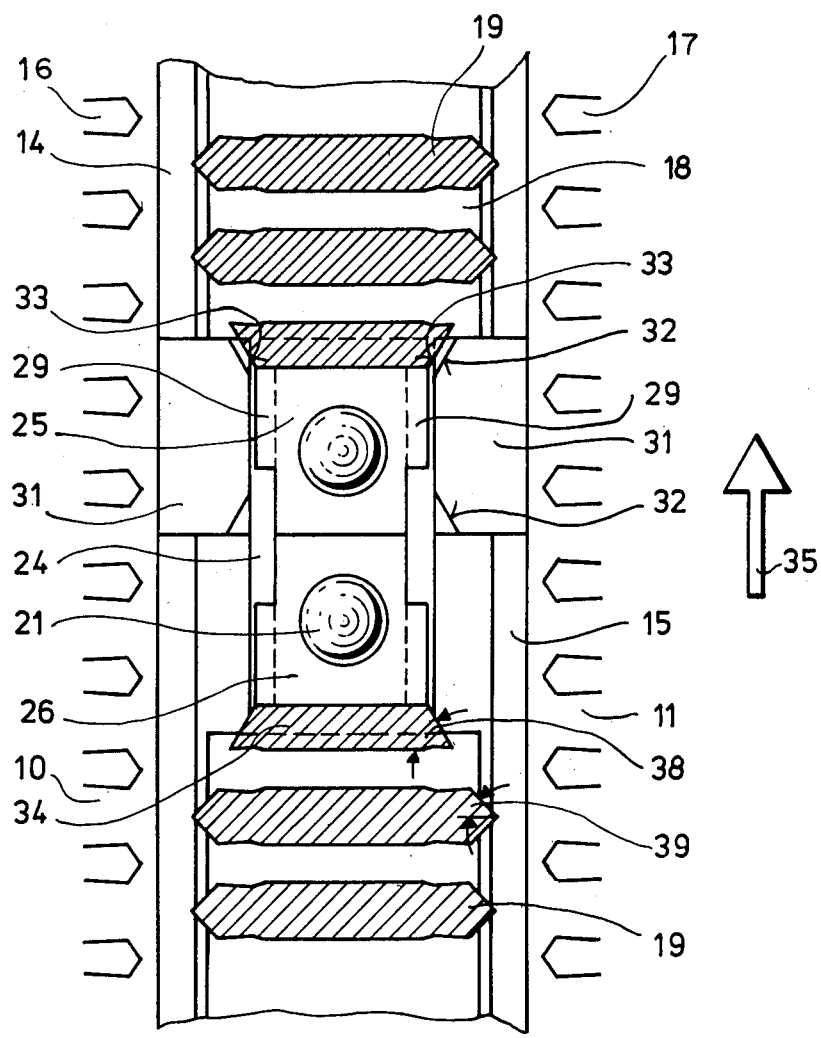
FIG. 3 shows a developed projection of the portion of a transmission shown in FIG. 2, along line III—III.

The portion of a transmission shown in FIGS. 1 to 3 comprises a shaft 1 carrying a guide sleeve 2 fixed thereon, by means of a toothing 3, against relative rotation and against axial displacement. Gears 4, 5 are rotatably seated on the shaft 1 on both sides of the guide sleeve 2. The gears 4, 5 are provided on their side facing the guide sleeve 2 with an axial extension 6, 7 comprising an external toothing 8, 9 with a clutch body 10, 11 attached thereto. The clutch bodies 10, 11 are provided with an internal toothing engaging the external toothing 8, 9 at the extensions 6, 7 so that they are connected with the coacting gears 4, 5 to rotate with the latter. Each of the clutch bodies is provided with a conical face forming a countercone 12, 13 for a synchronizing ring 14, 15. In addition, the clutch bodies 10, 11 are provided each with an external toothing 16, 17 over a portion of the their periphery adjoining the countercone 12, 13. The external toothing 16, 17 is identical in diameter and pitch to an external toothing 18 provided on the periphery of the guide sleeve 2 and engaged by the internal toothing of the gear shift sleeve 20 which in its inoperative position is arranged centrally to the center plane of the guide sleeve 2 and retained in this position by stop balls 21 engaging corresponding bores 22 in the gear shift sleeve 20 The stop balls are arranged in radial recesses 24 in the guide sleeve 2 together with the helical pressure springs loading them.

The recesses 24 in the guide sleeve 2 contain in addition two dogs 25, 26 arranged side by side in the circumferential direction and extending into a groove between the teeth of the internal toothing 19 of the gear shift sleeve 20. Each of the dogs 25, 26 is provided with a central bore 27, 27 enclosing each one stop ball 21 with the associated helical pressure spring 23. So, the dogs 25, 26 are connected with the gear shift sleeve 20 in the axial direction of the arrangement by a spring detent means. In the circumferential direction of the gear shift sleeve 20, the two dogs fit exactly into the groove provided for them in the internal toothing 29 so that in the circumferential direction they are held free from play relative to the two sleeves 2, 20. The two dogs 25, 26 are of absolutely identical design, but provided in the circumferential direction in laterally inversed arrangement relative to a radial plane of the transmission arrangement. Each of the dogs 25, 26 carries on its outer end, viewed in the circumferential direction, a projection 29 extending axially beyond its side face. In the circumferential direction, these projections extend over about half the length of the dogs.

Each of the synchronizing rings 14, 15 comprises a nose 31 projecting in the axial direction into the recess 24 of the guide sleeve 2 and in the radial direction into a recess in the internal toothing of the gear shift sleeve 20. The end faces of the noses 31 facing the dogs 25, 26 are provided with sloping portions forming check faces 32 coacting with counterfaces 33 at the ends of the teeth 34 which delimit the recess in the gear shift sleeve 20 and which are shorter in length than the remaining teeth of the internal toothing 19 of the gear shift sleeve 20. The synchronizing rings 14, 15 can be rotated in the circumferential direction relative to the guide sleeve 2 and the gear shift sleeve 20 within the limits permitted by the recess 24 in the guide sleeve 2 which is engaged by the noses 31 of the synchronizing rings 14, 15. The arrangement is such that when the synchronizing rings occupy their end positions in which their check faces 32 are located opposite the counterfaces 33 on the gear shift sleeve 20, their axial end faces are also located opposite the neighboring dogs 25, 26. The noses 31 extend in the circumferential direction of the arrangement up to the plane in which the neighboring dogs 25, 26 are in contact with each other. FIGS. 2 and 3 show the two possible end positions of the synchronizing rings 14, 15.

Now, when the gear shift sleeve 20 is axially displaced for engaging one of the gears, in the manner usual for such transmissions, the dogs 25, 26 are entrained by the spring detent means formed by the spring-loaded stop balls 21. As a result thereof, one of the dogs 25, 26 comes to bear with the end face of its projection 29 against the end face of the nose 31 of the neighboring synchronizing ring—viewed in the direction of displacement. To facilitate the further description, it will be assumed hereafter that the gear shift sleeve 20 is being displaced towards the right in FIGS. 1 and 3 in the direction of the gear 5. Further it will be assumed that the gear 5 rotates in the direction indicated by the arrow 35 at a speed higher than that of the shaft 1 with the guide and gear shift sleeves.

Accordingly, when the gear shift sleeve is displaced towards the right in the transmission arrangement shown in FIGS. 1 and 3, then the dog 25, being entrained by the spring detent means, is urged with its projection 29 against the nose 31 of the righthand synchronizing ring 15.

Accordingly, the synchronizing ring 15 is brought into engagement with the countercone 13 at the clutch body 11 of the gear 5. Consequently, the synchronizing ring 15 is entrained in the direction indicated by the arrow 35 until its nose 31 comes to rest against the flank of the recess 24 in the guide sleeve 2. When the gear shift sleeve 20 is further advanced, the tooth 34 of the gear shift sleeve 20 adjoining the nose 31 comes to rest with its outer face 33 against the check face 32 of the nose 31, whereby the gear shift sleeve is prevented from advancing further. At the same time, the gear shift sleeve exerts an axial force upon the synchronizing ring 15 due to which a braking force is exerted by the synchronizing ring upon the countercone 13 of the clutch body 11 which forces the gear 5 and the shaft 1, together with the guide sleeve 2 and gear shift sleeve 20, to rotate at equal speeds. When this condition has been reached, a further axial displacement of the gear shift sleeve becomes possible because the sloping counterface 33 at the tooth 34 of the gear shift sleeve causes the nose 31 of the synchronizing ring 15 to move laterally and the gear 5 with the clutch body 11 to rotate slightly relative to the shaft 1, as the synchronizing ring 15 is in frictional contact with the countercone 12 at the clutch body 11. When the gear shift sleeve 20 is further advanced in the axial direction, the connection with the dog 25 established by the stop ball 21 is released so that the gear shift sleeve 20 can be moved on unhindered by the dog 25.

After the counterface 33 at the tooth 34 has come out of engagement with the check face 32 at the nose of the synchronizing ring 15 and after the connection established by the spring detent means between the dog 25 and the gear shift sleeve 20 has been released, the synchronizing ring 15 is no longer under the effect of an axial force retaining it in friction contact with the the countercone 13 at the clutch body 11 so that the synchronizing ring 15 could come off the countercone 13 and the synchronization previously reached could get lost. This danger exists especially when the non-driven gear set is exposed to high braking forces, for instance due to the high viscosity of the transmission oil of a cold transmission. In this case, the internal toothing 19 of the gear shift sleeve and the external toothing 17 of the clutch body 11 are permitted to move again relative to each other so that the teeth of the gears hit against each other during engagement which leads to the known risk of damage and corresponding noise.

In the transmission shown in the drawing this risk is prevented in that when the synchronized condition is reached the check face 32 at the synchronizing ring 15 is moved out of the area of the counterface 33, while during such outward movement a flank 36 of the other dog 26 comes to rest against a coacting inner face 37 of the synchronizing ring 15 which is thereby subjected again to an axial force sufficient to maintain the frictional contact between the synchronizing ring 15 and the clutch body until the internal toothing 19 of the gear shift sleeve 20 enters the external toothing 9 of the clutch body. The connection between the dog 26 and the gear shift sleeve 20 established by the spring-loaded stop ball 21 is effective over a certain area of the axial displacement of the gear shift sleeve 20 which is sufficient to bring the internal toothing 19 of the gear shift sleeve into engagement with the clutch body 11, without any interruption of the axial loading of the synchronizing ring 15. Consequently, absolutely noiseless gear shifting is rendered possible by the synchronizing mechanism of the invention even under unfavorable circumstances.

A further particular advantage of the described embodiment of the synchronizing mechanism is to be seen in the fact that the angle 38 at which the counterfaces 33 and, thus, also the check faces 32 at the synchronizing ring extend to the axial direction may be different from the angle 39 existing at the ends of the teeth of the internal toothing 19 of the gear shift sleeve 20 and, thus, also at the ends of the teeth of the external toothing 17 of the clutch body 11. Accordingly, the two angles can be optimally selected independently of each other with a view to achieving on the one hand the best possible locking effect, without any undesirable self-locking effect in the circumferential direction of the synchronizing mechanism, and ensuring on the other hand perfect engagement of the toothings, this being normally enhanced by small angles 39.

Figure 4:
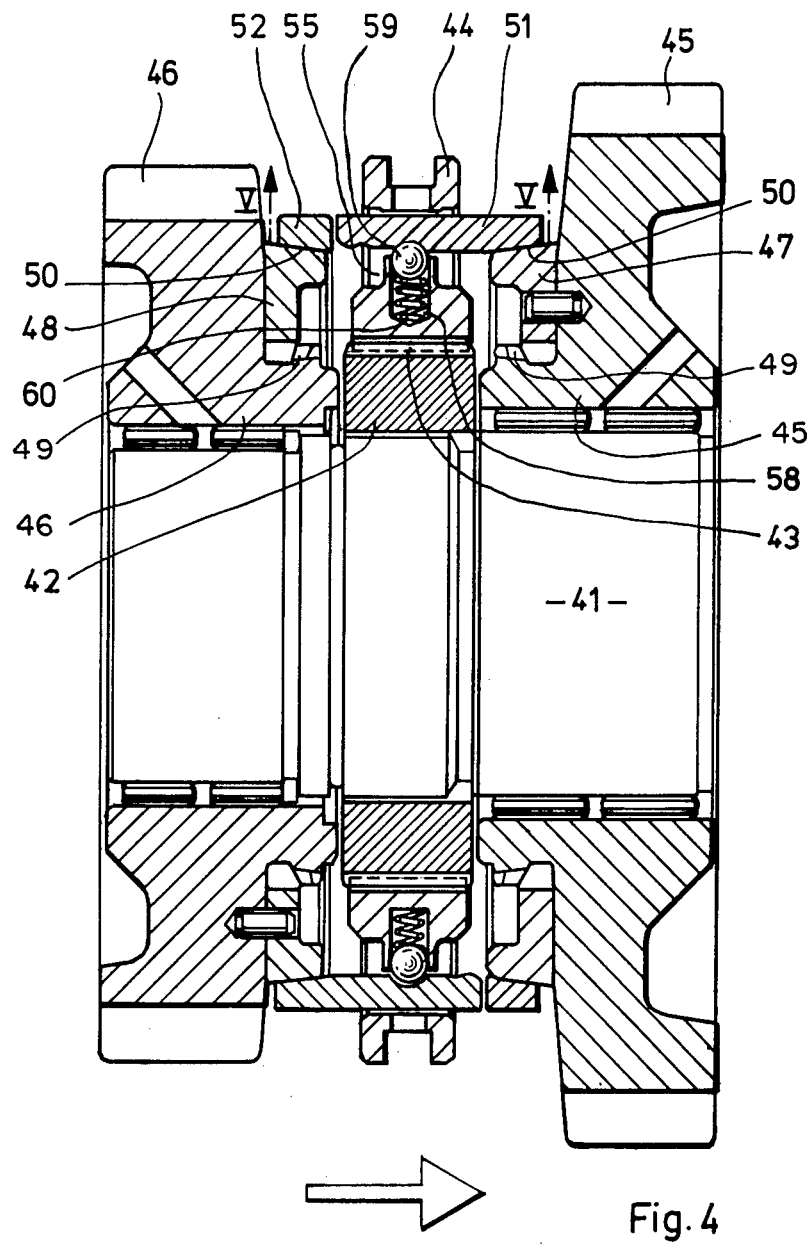
FIG. 4 shows a longitudinal cross-section through another portion of a transmission comprising a synchronizing mechanism in accordance with the invention.
Figure 5:
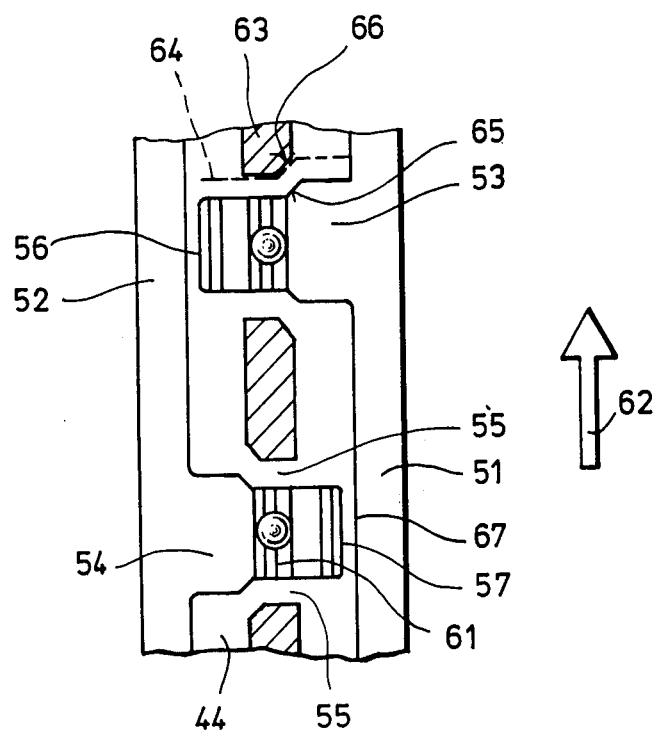
FIG. 5 shows a developed projection of the arrangement of FIG. 4, along line IV—IV.

In the embodiment shown in FIGS. 4 and 5, a guide sleeve 42 is again mounted on a shaft 41 to rotate with the latter. The guide sleeve 42 is provided with an external toothing 43 engaged by the internal toothing of a gear shift sleeve 44 which embraces the guide sleeve 42 in concentrical relationship and can be displaced in the axial direction relative to the guide sleeve. Again, two gears 45, 46 are rotatably seated on the shaft 41 on both sides of the sleeves. Each of the gears carries on its side facing the sleeves a friction ring 47, 48. The external toothing 43 of the guide sleeve has the same diameter and the same pitch as an external toothing 49 provided on the gears 45, 46. Each of the friction rings is provided on its outside—relative to the outer toothing 49—with a conical surface forming the countercone 50 for synchronizing rings 51, 52.

As can be seen best in FIG. 5, the synchronizing rings 51, 52 of this embodiment of the invention are provided on their inner flanks with lugs 53, 54 extending axially through recesses 55 in the gear shift sleeve 55. The end faces 56, 57 of these lugs are located opposite, but at a certain distance from the inner face of the neighboring synchronizing ring 51, 52.

The recesses 55 in the gear shift sleeve 44 permit the synchronizing rings 51, 52 to move relative to the gear shift sleeve 44 both in the circumferential direction and in the axial direction of the arrangement. The synchronizing rings are again retained in a given position in the axial direction by spring detent means comprising a stop ball 59 which is arranged in a radial bore 58 of the gear shift sleeve, loaded by a helical pressure spring 60 and which engages a groove 61 provided on the inside of the respective lug 53, 54 and extending in the circumferential direction.

When in this embodiment of the invention the gear shift sleeve is moved to the right in the arrangement shown in the drawing, in the manner described before, then the righthand synchronizing ring 51 is entrained by the stop ball 59 through the same detent means and brought into engagement with the countercone 50 of the righthand friction ring 47. The resulting frictional moment causes the synchronizing ring 51 to rotate relative to the gear shift sleeve 44 in the direction indicated by the arrow 62, under the same conditions as described in connection with the embodiment described before, until the lug 53 comes to rest against the web 63 delimiting the corresponding recess 55, as indicated in FIG. 5 by the broken line 64, whereby one of the check faces 65 provided on the lugs 53 is moved into the area of the counterface 66 at the web 63. The axial force exerted upon the gear shift sleeve 44 acts in turn to brake the friction ring 47 with the gear 45 and, thus, to synchronize the speeds, whereafter the gear shift sleeve 44 can be moved past the check face 65 by a slight rotary movement of the synchronizing ring 51 and the gear 45. While the counterface 66 at the gear shift sleeve 44 comes out of engagement with the check face 65 at the synchronizing ring 51 and, accordingly, the axial force is no longer exerted upon the synchronizing ring 51, the end face 57 of the lug 54 of the other synchronizing ring 52 comes to bear against the inner flank 67 of the synchronizing ring 51, whereby another axial force is transmitted upon the synchronizing ring 51 because the other synchronizing ring 52 has followed the movement of the gear shift sleeve due to the connection realized by the spring detent means. Similarly, the inner flank 68 of the left synchronizing ring 52 in the drawing comes to rest against the end face 56 of the lug 53 of the synchronizing ring 51, which is in engagement with the countercone of the gear 45 to be engaged. Thus, an axial force is exerted upon the synchronizing ring 51 via the connection established through the spring-loaded stop balls 59 until the internal toothing of the gear shift sleeve 44 has reached and engages the external toothing 49 at the gear 45. And again, shifting without any jerks is ensured in this manner.

The embodiment of the invention described last may be regarded as if dogs in the form of lugs 53, 54 were connected with the associated synchronizing ring 51, 52 to form an integral part thereof. Again, it is an advantage of this arrangement that the check faces 65 and their counterfaces 66 are separate from the toothing establishing the connection between the gear shift sleeve and the gear so that in both cases different angles can be used which are optimally suited for the intended purpose. And again, the angle between the check faces 65 and the axial direction should be greater than the corresponding angle at the ends of the teeth to be brought into engagement.

Figure 6:
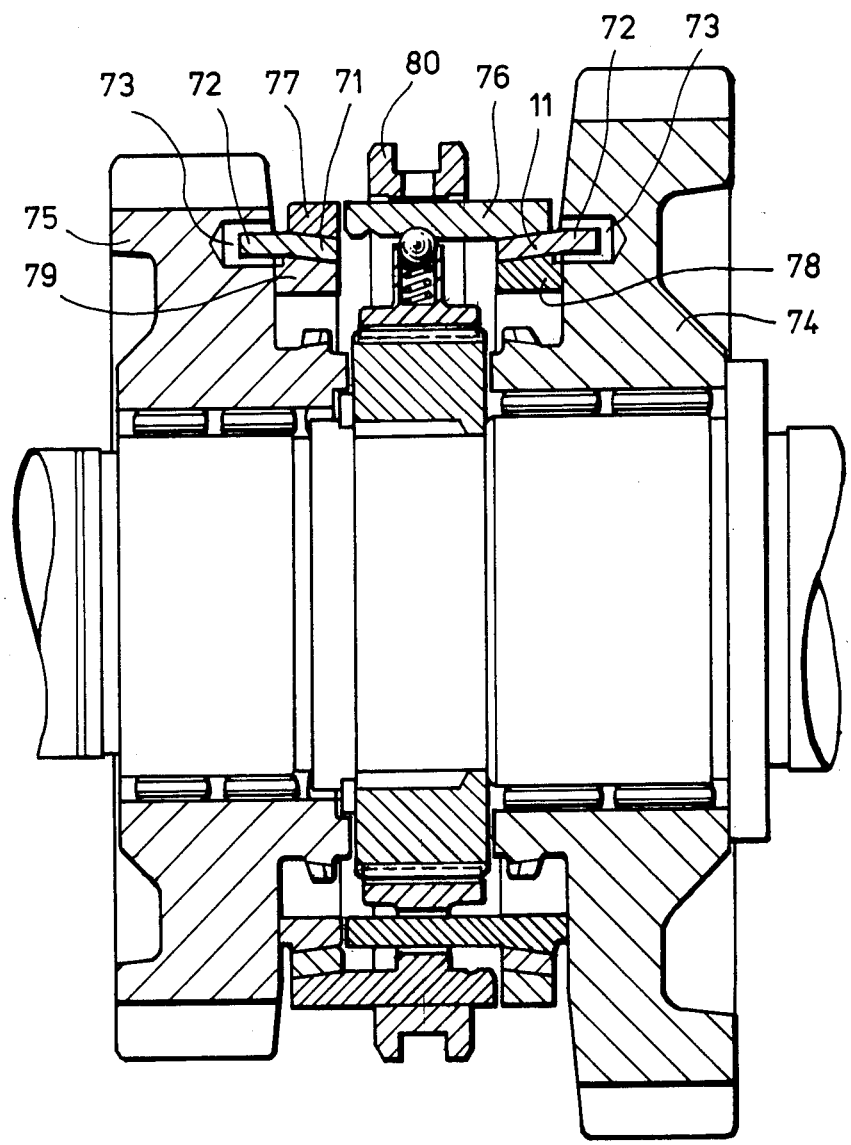
FIG. 6 shows a longitudinal section through a portion of a transmission similar to that shown in FIG. 4, but with a variant of the synchronizing mechanism.

A particularity of the embodiment of the invention described last is to be seen in the fact that seating the synchronizing rings within recesses of the gear shift sleeve by means of lugs offers the possibility to give the conical faces serving to achieve the synchronization a much larger diameter than the toothing serving to establish the fixed engagement. This increases considerably the diameter of the synchronizing ring, which in turn reduces either the force or the time required for carrying out the synchronizing process. In addition, the large surfaces are advantageous for dissipating the frictional heat generated by the synchronizing process. In the embodiment shown in FIG. 6, this effect is even improved by the fact that the clutch bodies are replaced by conical rings 71 whose outer edges are provided with projections 72 engaging bores 73 in the adjacent end faces of the gears to be brought into engagement. The outer conical faces of the cone-shaped rings 71 are in turn engaged by synchronizing rings 76, 77 designed and held in the same way as the synchronizing rings 51, 52 of the embodiment shown in FIGS. 4 and 5. There are provided additional synchronizing rings 78, 79 which engage the inner conical faces of the cone-shaped ring 71. Contrary to the outer synchronizing rings 76, 77, these synchronizing rings are, however, not connected with the gear shift sleeve 80 through spring detent means, and the synchronizing rings are also not provided with check faces coacting with counterfaces at the gear shift sleeve 80. Instead, the inner synchronizing rings 78, 79 bear with their outer faces against the corresponding end face of the neighbouring gear 74 or 75. It goes without saying that the invention can be used to facilitate the synchronizing process also in arrangements having an even greater number of friction faces.

In the embodiments of the invention described before, the rotary angle of the synchronizing rings which is defined by recesses in the guide sleeve or gear shift sleeve, is greater than the pitch angle of the toothings at the gear shift sleeve and the clutch body which are to be brought into engagement. Although this fact can be seen only in FIG. 3 of the drawing, it is true also for the other embodiments. As has been explained before, when the synchronized condition has been reached and the gear shift sleeve 20 is further engaged, the synchronizing ring 15, and the clutch body which is connected therewith by frictional contact, are rotated relative to the gear shift sleeve 20 until the tooth 34 of the gear shift sleeve carrying the counterfaces 33 can slide past the opposite nose 31. Thereafter, the teeth of the inner toothing 19 of the gear shift sleeve 20 must be introduced between the teeth of the outer toothing 16 of the neighboring clutch body. When the two toothings do not occupy the exact position required for intermeshing engagement, the clutch body 11 must be moved once more relative to the gear shift sleeve 20, via the inclined faces at the pointed teeth. The relatively large play of the synchronizing ring relative to the gear shift sleeve allows such rotation to increase the distance between the tooth 34 and the nose 31 without any need to release the synchronizing ring 15 from the countercone of the clutch body. Thus, absolutely jerk-free shifting is rendered possible. However, this condition is obtained only in 50% of all cases because statistically it will happen in as many cases that the flanks at the end faces of the toothings will meet in a manner which would require the nose 31 to be approached further to the neighboring tooth 34 by the rotation of the synchronizing ring 15, which requirement can however not be fulfilled because the nose 31 is already in contact with the side face of the same tooth. In this case, the necessary rotation of the external toothings 17 of the clutch body 11 relative to the internal toothing 19 of the gear shift sleeve 20 can be effected only by releasing the synchronizing ring 15 from the countercone of the clutch body, and this requires some additional force. However, it is already to be regarded as considerable progress that the second pressure point occurring during shifting, which was frequently felt to be very disturbing, is eliminated in 50% of all cases.

It goes without saying that the stop bodies provided in the form of dogs or lugs on the synchronizing rings may be arranged at several points along the periphery of the synchronizing mechanism. Preferably, three such arrangements are distributed over the periphery of the guide sleeve and gear shift sleeve. Finally, it is also understood that the invention is not limited to the embodiments shown, but that to achieve the axial loading of the synchronizing rings stop bodies of the most different types may be used which are connected in the axial direction with the gear shift sleeve via spring detent means and which ensure that the synchronizing ring cannot come off the countercone before the toothings serving to realize the frictional connection between the guide sleeve and the gear to be engaged have been brought into engagement.

We claim:
1. A synchronizing mechanism for a clutch which is particularly useful for a transmission of a motor vehicle, comprising
   a rotary axial shaft,
   at least one gear rotatable coaxially relative to said shaft,
   a guide sleeve connected to said shaft so as to be rotatable therewith,
   said guide sleeve having external toothing thereon,
   a gear shift sleeve having internal toothing meshing with the external toothing on said guide sleeve and providing for axial sliding movement of said gear shift sleeve along said guide sleeve while said gear shift sleeve is rotatable with said guide sleeve,
   said gear including a clutch body having external clutch toothing for selective meshing with said internal toothing on said gear shift sleeve,
   a synchronizing ring coaxial with said shaft and having form-locking engagement with said gear shift sleeve for rotation therewith while providing for limited angular movement relative thereto,
   said synchronizing ring being frictionally engageable with said clutch body,
   first spring detent means and a first pressure body disposed between said gear shift sleeve and said synchronizing ring for initially pressing said synchronizing ring axially into frictional engagement with the clutch body upon initial axial movement of said gear shift sleeve from its initial neutral position toward said gear,
   the frictional engagement causing the synchronizing ring and the gear shift sleeve to be brought to a rotary speed substantially synchronous with the rotary speed of the gear, means on the gear shift sleeve and the synchronizing ring forming sloping check faces which come into contact as the gear shift sleeve is being brought into synchronism with the gear, the check faces then being slidable axially and circumferentially to escape from each other so as to provide for synchronous meshing of the internal toothing on said gear shift sleeve with the external clutch toothing of the clutch body on the gear, a second pressure body having form-locking engagement with the gear shift sleeve whereby the pressure body is rotatable therewith, and second spring detent means disposed between the gear shift sleeve and the second pressure body for causing axial movement of the second pressure body with the gear shift sleeve until the second pressure body comes into engagement with the synchronizing ring and exerts pressure against the synchronizing ring to maintain the frictional engagement between the synchronizing ring and the clutch body, the second pressure body having an initial axial spacing from the synchronizing ring when the gear shift sleeve is in its initial position, such initial axial spacing being substantially equal to the axial distance which must be traveled by the gear shift sleeve to produce the axial movement between the check faces whereby the check faces escape from each other, so that the second pressure body engages the synchronizing ring and exerts axial pressure thereon to maintain the synchronizing ring in frictional engagement with the clutch body when the check faces escape from each other, so as to prevent loss of synchronism when the internal toothing on the gear shift lever is moving into mesh with the external clutch toothing of the clutch body on the gear.

2. A synchronizing mechanism according to claim 1, in which said first and second pressure bodies are in the form of first and second dogs carried for rotation with said gear shift sleeve and for sliding movement in axial direction relative to said gear shift sleeve.

3. A synchronizing mechanism in accordance with claim 2,
in which said gear shift sleeve comprises axially directed groove means for slidably receiving said first and second dogs.

4. A synchronizing mechanism according to claim 2, in which said guide sleeve comprises axially directed groove means for slidably receiving said first and second dogs.

5. A synchronizing mechanism according to claim 2, in which said gear shift sleeve and said guide sleeve include axially directed groove means for slidably receiving said first and second dogs.

6. A synchronizing mechanism according to any of claims 2–5,
in which the synchronizing ring includes a projection which is engageable by said first dog to apply axial pressure therebetween for producing frictional engagement between the synchronizing ring and the clutch body,
said projection being of such narrow width as to obviate any engagement between said second dog and said projection when said projection is fully engaged by said first dog,
whereby said initial spacing is produced between said second dog and said synchronizing ring.

7. A synchronizing mechanism according to any of claims 2–5,
in which the synchronizing ring includes a projection which is engageable by said first dog to apply axial pressure therebetween for producing frictional engagement between the synchronizing ring and the clutch body,
said projection being of such narrow width as to obviate any engagement between said second dog and said projection when said projection is fully engaged by said first dog,
whereby said initial spacing is produced between said second dog and said synchronizing ring,
said first dog having a first axially projecting portion for axially engaging the projection on said synchronizing ring,
said second dog having a similar axially projecting portion for axially engaging the synchronizing ring after axial movement of said gear shift sleeve to close up said initial axial spacing.

8. A synchronizing mechanism for a clutch which is particularly useful in a transmission for a motor vehicle, comprising
an axial rotatable shaft,
a guide sleeve secure to said shaft and rotatable therewith,
said guide sleeve having external toothing,
a gear shift sleeve having internal toothing for slidably receiving said external toothing,
said gear shift sleeve being rotatable with said guide sleeve while being axially slidable along said guide sleeve,
first and second gears rotatably coaxially with said shaft and disposed on opposite sides of said guide sleeve and said gear shift sleeve,
said first and second gears having respective first and second clutch bodies thereon with first and second external clutch toothing,
said gear shift sleeve being slidable for selective meshing of its internal toothing said external clutch toothing on said first and second clutch bodies,
a first synchronizing ring disposed between said gear shift sleeve and said first gear,
said first synchronizing ring having from-locking engagement with said gear shift sleeve while being frictionally engageable with said first clutch body,
said form-locking engagement providing for limited angular play between said first synchronizing ring and said gear shift sleeve,
a second synchronizing ring disposed between said gear shift sleeve and said second gear,
said second synchronizing ring having form-locking engagement with said gear shift sleeve while being frictionally engageable with said second clutch body,
said last-mentioned form-locking engagement providing for limited angular play between said second synchronizing ring and said gear shift sleeve,
first spring detent means and a first pressure body forming a first connection between said gear shift sleeve and said first synchronizing ring for initially applying axial pressure to said first synchronizing ring to produce frictional engagement between said first synchronizing ring and said first clutch body when said gear shift sleeve is moved axially from its initial neutral position toward said first gear whereby the speeds of said synchronizing ring and said gear shift sleeve are brought into synchronism with the speed of said first gear, means forming a first pair of sloping check faces between said gear shift sleeve and said first synchronizing ring, said check faces being slidable axially and circumferentially when synchronism is achieved, whereby said check faces escape from each other and said internal toothing on said gear shift sleeve slides synchronously into mesh with the first external clutch toothing of the clutch body on said first gear, second spring detent means and a second pressure body connected between said gear shift sleeve and said second synchronizing ring for applying axial pressure to said second synchronizing ring and thereby producing frictional engagement between said second synchronizing ring and said second clutch body when said gear shift sleeve is moved axially from its initial neutral position toward said second gear, said last-mentioned frictional engagement bringing the speed of said second synchronizing ring and said gear shift sleeve into synchronism with the speed of said second gear, and means forming a second pair of sloping check faces between said gear shift sleeve and said second sychronizing ring, said second pair of check faces coming into engagement and then sliding axially and circumferentially until said second pair of check faces escape from each other and said internal toothing on said gear shift sleeve slides synchronously into mesh with said second external clutch toothing of the second clutch body on said second gear, said second pressure body having a particular portion thereon with an axial spacing between said particular portion and said first synchronizing ring, said axial spacing being substantially equal to the axial distance which must be traveled by said gear shift sleeve to cause said check faces of said first pair to escape from each other, after which said second spring detent means cause said particular portion of said second pressure body to engage said first synchronizing ring to maintain frictional engagement between said first synchronizing ring and said first clutch body so that synchronism will not be lost as the internal toothing on said gear shift moves into mesh with the external clutch toothing of the first clutch body, said first pressure body having a particular portion with a similar axial spacing from said second synchronizing ring, said last-mentioned axial spacing being substantially equal to the axial distance which must be traveled by said gear shift sleeve to cause said check faces of said second pair of escape from each other, after which said particular portion of said first pressure body engages said second synchronizing ring and maintains frictional engagement between said second synchronizing ring and said second clutch body to prevent loss of synchronism as the internal toothing of said gear shift sleeve moves into mesh with the external toothing of said second clutch body on said second gear.

9. A synchronizing mechanism according to claim 8, in which said first and second pressure bodies take the form of first and second dogs which are carried for rotation with said gear shift sleeve and for axial sliding movement relative to said gear shift sleeve and relative to each other.

10. A synchronizing mechanism according to claim 9, in which the first synchronizing ring includes a first axial projection which is engagement by said first dog to apply axial pressure therebetween for producing frictional engagement between the first synchronizing ring and the first clutch body when the gear shift is moved toward the first gear, said first projection being of such narrow width as to obviate any engagement between said second dog and said first projection when said first projection is fully engaged by said first dog, whereby said initial axial spacing is produced between said second dog and said first synchronizing ring, said second synchronizing ring including a second projection which is engageable by said second dog to apply axial pressure therebetween for producing frictional engagement between said second synchronizing ring and said second clutch body when said gear shift sleeve is moved axially toward said second gear, said second projection being of such narrow width as to obviate any engagement between said first dog and said second projection when said second projection is fully engaged by said second dog, whereby said initial axial spacing is produced between said first dog and said second synchronizing ring.

11. A synchronizing mechanism according to claim 10, in which each of said first and second dogs has a pair of portions projecting axially therefrom in opposite axial directions, said last-mentioned portions of said dogs being axially engageables with said first and second projections and with said first and second synchronizing rings.

12. A synchronizing mechanism in accordance with either claim 10 or claim 11, in which one of the check faces of each pair is located on one of the first and second projections, the other check face of each pair being located on the gear shift sleeve.

13. A synchronizing mechanism according to claim 8, in which said first and second pressure bodies are in the form of first and second lugs mounted on the first and second synchronizing rings and projecting axially therefrom toward the gear shift sleeve, said gear shift sleeve having openings therein for receiving said lugs with angular play between said gear shift sleeve and said lugs, said particular portions of said first and second pressure bodies being in the form of end portions of said first and second lugs, said end portions extending through said openings to establish said initial axial spacing between the end portion of each of said lugs and the opposite synchronizing ring.

* * * * *